(12) United States Patent
Reddy et al.

(10) Patent No.: US 11,577,665 B2
(45) Date of Patent: Feb. 14, 2023

(54) URETHANE AND GRAPHENE INTERIOR TRIM PANEL

(71) Applicant: CpK Interior Products Inc., Port Hope (CA)

(72) Inventors: Murali Mohan Reddy, Belleville (CA); Gregory James Farrar, Roblin (CA)

(73) Assignee: CpK Interior Products, Port Hope (CA)

( * ) Notice: Subject to any disclaimer, the term of this patent is extended or adjusted under 35 U.S.C. 154(b) by 523 days.

(21) Appl. No.: 16/802,830

(22) Filed: Feb. 27, 2020

(65) Prior Publication Data

US 2021/0268969 A1 Sep. 2, 2021

(51) Int. Cl.
| | | |
|---|---|---|
| *B60R 13/02* | (2006.01) | |
| *B29B 7/90* | (2006.01) | |
| *B29B 9/12* | (2006.01) | |
| *B29C 41/00* | (2006.01) | |
| *B29C 41/04* | (2006.01) | |
| *B29C 44/12* | (2006.01) | |
| *B29K 75/00* | (2006.01) | |
| *B29K 507/04* | (2006.01) | |

(Continued)

(52) U.S. Cl.
CPC ............. *B60R 13/02* (2013.01); *B29B 7/90* (2013.01); *B29B 9/12* (2013.01); *B29C 41/003* (2013.01); *B29C 41/04* (2013.01); *B29C 44/1228* (2013.01); *B60R 13/0256* (2013.01); *B29K 2075/00* (2013.01); *B29K 2507/04* (2013.01); *B29L 2031/3041* (2013.01); *B60R 21/2165* (2013.01)

(58) Field of Classification Search
CPC ....... B60R 13/02; B60R 13/0256; B29B 7/90; B29B 9/12; B29C 41/003; B29C 41/04; B29C 44/1228; B29K 2075/00; B29K 2507/04; B29L 2031/3041
See application file for complete search history.

(56) References Cited

U.S. PATENT DOCUMENTS

| | | | |
|---|---|---|---|
| 5,580,501 | A | 12/1996 | Gallagher et al. |
| 5,824,738 | A | 10/1998 | Humphrey |

(Continued)

FOREIGN PATENT DOCUMENTS

| | | |
|---|---|---|
| CN | 106 065 308 A | 11/2016 |
| CN | 108059819 A | 5/2018 |

(Continued)

OTHER PUBLICATIONS

CN-110643117-A computer translation from Search (Year: 2020).*

(Continued)

*Primary Examiner* — D Glenn Dayoan
*Assistant Examiner* — Melissa Ann Bonifazi
(74) *Attorney, Agent, or Firm* — Harness Dickey & Pierce, PLC

(57) ABSTRACT

A urethane and graphene interior trim panel is provided. In another aspect, the interior trim panel may be an automotive vehicle instrument panel, airbag cover, door trim panel, center console, knee bolster, seat mechanism cover, pillar cover or the like. A further aspect includes a graphene infused thermoplastic polyurethane compound and more particularly a TPU-graphene composition or mixture which can be ground, molded and then used in vehicle interior applications.

31 Claims, 4 Drawing Sheets

(51) Int. Cl.
*B29L 31/30* (2006.01)
*B60R 21/2165* (2011.01)

(56) References Cited

U.S. PATENT DOCUMENTS

| | | | |
|---|---|---|---|
| 6,346,320 B2 | 2/2002 | Doteguchi et al. |
| 6,548,600 B2 | 4/2003 | Walton |
| 6,548,960 B2 | 4/2003 | Inukai |
| 6,808,197 B2 | 10/2004 | Bauer et al. |
| 6,896,310 B1 | 5/2005 | Trappe et al. |
| 6,982,302 B2 | 1/2006 | Kanae et al. |
| 7,318,498 B2 | 1/2008 | Woodman et al. |
| 7,560,515 B2 | 7/2009 | Tansey |
| 7,571,928 B2 | 8/2009 | Soejima |
| 7,659,350 B2 | 2/2010 | Prud'Homme et al. |
| 7,732,520 B2 | 6/2010 | Onizawa et al. |
| 7,935,754 B2 | 5/2011 | Prud'Homme et al. |
| 8,066,964 B2 | 11/2011 | Prud'Homme et al. |
| 8,178,640 B2 | 5/2012 | Smith et al. |
| 8,794,661 B2 | 8/2014 | Cowelchuk et al. |
| 9,039,938 B2 | 5/2015 | Crain et al. |
| 9,120,908 B2 | 9/2015 | Russ et al. |
| 9,334,386 B2 | 5/2016 | Alsharaeh et al. |
| 9,358,767 B2 | 6/2016 | Wisniewski et al. |
| 9,440,385 B2 | 9/2016 | Suzuki et al. |
| 9,539,745 B2 | 1/2017 | Shane |
| 9,623,827 B2 | 4/2017 | Fischer et al. |
| 9,713,972 B2 | 7/2017 | Bozio et al. |
| 9,777,171 B1 | 10/2017 | Redmond et al. |
| 9,815,897 B2 | 11/2017 | King et al. |
| 9,896,565 B2 | 2/2018 | Nosker et al. |
| 10,093,268 B2 | 10/2018 | Cowelchuk et al. |
| 10,232,755 B2 | 3/2019 | Brines et al. |
| 10,328,881 B2 | 6/2019 | Bozio et al. |
| 10,329,391 B2 | 6/2019 | Nosker et al. |
| 10,358,159 B2 | 7/2019 | Pekari |
| 10,583,591 B2 | 3/2020 | Mitsutsuji et al. |
| 2006/0045996 A1 | 3/2006 | Fujibayashi et al. |
| 2010/0291366 A1 | 11/2010 | Humphrey, Jr. et al. |
| 2011/0223405 A1 | 9/2011 | Compton et al. |
| 2011/0301265 A1 | 12/2011 | Brunner et al. |
| 2015/0203657 A1 | 7/2015 | Gredegard et al. |
| 2015/0360597 A1 | 12/2015 | Galbreath et al. |
| 2017/0100992 A1 | 4/2017 | Ruybal |
| 2017/0240736 A1 | 8/2017 | Farrar |
| 2018/0044536 A1 | 2/2018 | Walia et al. |
| 2018/0179357 A1 | 6/2018 | Lu et al. |
| 2019/0119463 A1 | 4/2019 | Maia et al. |
| 2019/0233611 A1 | 8/2019 | Nosker et al. |
| 2019/0322836 A1 | 10/2019 | Gilles et al. |
| 2019/0344689 A1 | 11/2019 | Bailey |
| 2020/0139814 A1 | 5/2020 | Garcia et al. |

FOREIGN PATENT DOCUMENTS

| | | | |
|---|---|---|---|
| CN | 108517123 A | | 9/2018 |
| CN | 110643117 A | * | 1/2020 |
| CN | 110643117 A | | 1/2020 |
| EP | 3871926 A1 | | 9/2021 |
| JP | 2003/155223 A | | 5/2003 |
| JP | 2004/352179 A | | 12/2004 |
| JP | 4082279 B2 | | 4/2008 |
| JP | 2015/509474 A | | 5/2015 |
| JP | 2015/198496 A | | 11/2015 |
| JP | 6021946 B2 | | 11/2016 |
| JP | 2017/071106 A | | 4/2017 |
| JP | 2018/078284 A | | 5/2018 |
| JP | 2018/178117 A | | 11/2018 |
| JP | 6574669 B2 | | 9/2019 |
| KR | 20090077005 A | | 7/2009 |
| KR | 20140005684 A | | 1/2014 |
| KR | 101401757 B1 | | 6/2014 |
| WO | WO-2015/064708 A1 | | 5/2015 |

OTHER PUBLICATIONS

Stankovich et al., "Graphene-based composite materials," Nature vol. 442, Jul. 20, 2006.

Indrani Das Jana et al.; Development of a copper-graphene nanocomposite based transparent coating with antiviral activity against influenza virus; Sep. 2, 2020; bioRxiv Cold Spring Harbor Laboratory; whole document (Year: 2020).

European Search Report, Munich (dated Jan. 13, 2022).

Matharu, R., et al., "Viral filtration using carbon-based materials," Medical Devices & Sensors, vol. 3, No. 4, (Jul. 12, 2020).

Cortes, A., et al., "The use of copper to help prevent transmission of SARS-coronavirus and influenza. A general review," Diagnostic Microbiology and Infectious Disease, Elsevier, Amsterdam, NL, vol. 98, No. 4, (Aug. 15, 2020).

Behzadinasab, S., et al., "A Surface Coating that Rapidly Inactivates SARS-CoV-2," Applied Material Material & Interfaces, vol. 12, No. 31, p. 34723 (Aug. 5, 2020).

Revels, M., "Former student's company creates antiviral material for masks," Texas A&M University Enginering, (Sep. 3, 2020).

"COVID-19 Anti-viral Zinc Oxide ZnO Film," p. 1-7 (Sep. 3, 2020).

Intention to Grant, European Patent Office (dated Mar. 12, 2021).

* cited by examiner

URETHANE AND GRAPHENE INTERIOR TRIM PANEL

BACKGROUND AND SUMMARY

The present disclosure relates generally to an interior trim panel and more particularly to a urethane and graphene interior trim panel.

Traditionally, automotive vehicle instrument panel skins are made from a variety of polymeric materials including polyvinyl chloride ("PVC"), thermoplastic polyurethane ("TPU"), thermoplastic polyolefin ("TPO") and thermoplastic elastomers ("TPEs"). These skins can be made by methods such as slush rotational molding and thermoforming. Examples are disclosed in U.S. Patent Publication No. 2017/0240736 entitled "Polyvinylchloride for Seamless Airbag Doors" invented by Farrar, and U.S. Pat. No. 7,560,515 entitled "PVC Alloy for Use in Air Bag Doors" which issued to Tansey on Jul. 14, 2009, both of which are incorporated by reference herein.

In the past, TPU was used for separate airbag doors assembled to instrument panels. More recently, U.S. Pat. No. 5,824,738 entitled "Light Stable Aliphatic Thermoplastic Urethane Elastomers and Method of Making Same," which issued to Humphrey et al. on Oct. 20, 1998, discusses the traditional use of a light stable aliphatic thermoplastic polyurethane formed by slush molding. This patent is incorporated by reference herein. Conventional TPU, however, undesirably "self-heals" or rejoins where an airbag cover door tear seam is intentionally created by scoring the skin with a knife or the like. Furthermore, it is believed that aliphatic TPU and PVC blends/alloys exhibit reductions of their original physical properties and tend to become brittle over time when exposed to high heat during the lifetime of the interior trim component.

South Korean Patent No. 2014-0005684 discloses a thermoplastic polyurethane film containing 30-40% by weight of graphene powder. This very large concentration of graphene undesirably causes the TPU to become hard and rigid. Therefore, the lack of flexibility makes removal of the film from a mold difficult and the final product lacks the desired soft feel and impact absorption for vehicle occupants and does not contain the required flexural properties to allow for satisfactory airbag deployments.

In accordance with the present invention, a urethane and graphene interior trim panel is provided. In another aspect, the interior trim panel may be an automotive vehicle instrument panel, airbag cover, door trim panel, center console, knee bolster, seat mechanism cover, pillar cover or the like. A further aspect includes a graphene infused thermoplastic polyurethane compound and more particularly a TPU-graphene composition or mixture which can be ground, molded and then used in vehicle interior applications. A method of making a urethane and graphene interior trim panel is also disclosed.

The present apparatus and method are advantageous over conventional devices. For example, the present graphene infused thermoplastic polyurethane produces enhanced heat performance along with improved electromagnetic interference ("EMI") shielding properties. Furthermore, the present method employs a grinding process which results in a final product having superior flow-ability and viscosity during slush or rotational molding in comparison to traditional low temperature deployable grade plastics, such as PVCs and TPUs. The present apparatus and method employ an advantageous concentration of graphene which maintains final panel flexibility and softness yet achieves desired electromagnetic interference shielding of electronic components, such as electronic controllers, sensors and the like, assembled to or located behind the trim panel. Additional features and advantages can be ascertained from the following description and claims taken in conjunction with the appended drawings.

DETAILED DESCRIPTION

Figure 1:
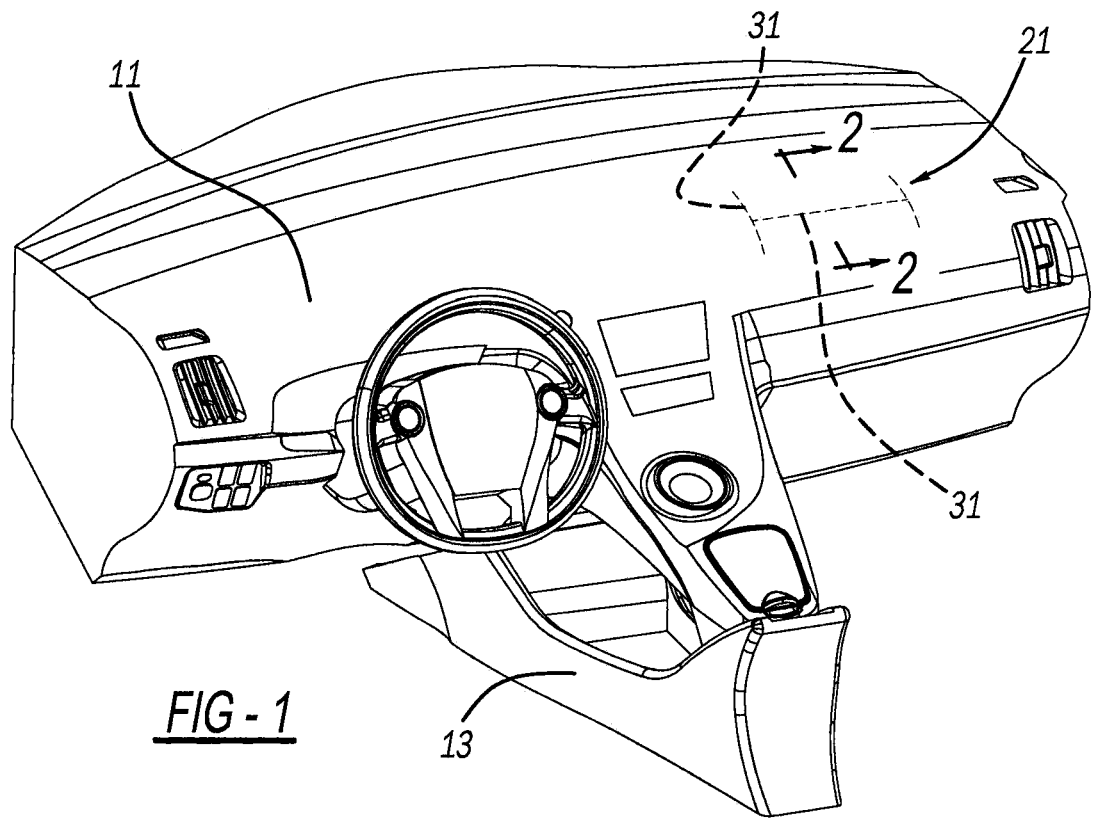
FIG. 1 is a perspective view showing the present interior trim panel.
Figure 2:
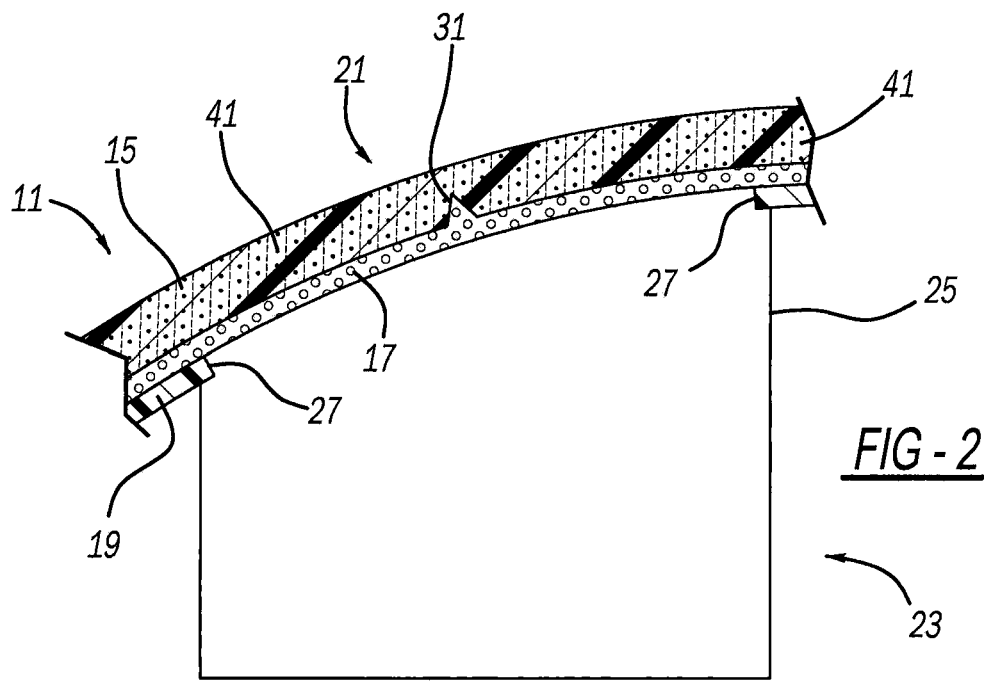
FIG. 2 is a cross-sectional view, taken along line 2-2 of FIG. 1, showing the present interior trim panel.

An interior trim panel for a wheeled automotive land vehicle is shown in FIGS. 1 and 2. The interior trim panel is preferably an instrument panel 11 but may alternately include a center console 13, a separate airbag cover, a door trim panel, center console, a knee bolster, a seat mechanism cover, a pillar cover, or the like. Instrument panel 11 includes an outer skin 15, a middle pliable foam layer 17 and an inner rigid substrate 19.

A section of skin 15 acts as an integral airbag door 21 behind which is an airbag assembly 23 including a chute 25. Airbag door 21 hinges or pivots about upper and lower flexure lines adjacent generally horizontally elongated substrate edges 27 when an expanding airbag bursts tear seams 31 in skin 15. A "seamless" or hidden style of skin 15 is preferred whereby tear seams 31 are on the backside surface thereof and are not visible to the vehicle occupant or user. Tear seams 31 preferably have an H-shape, although other configurations such as U-shapes, and X-shapes can be employed.

Tear seams 31 can be created using a gantry driven laser or an articulated robotically driven knife which horizontally slides along the backside surface of skin 15 after it is formed. After scoring, the tear seam 31 material remaining is between 0.3-0.66 mm with an average of 0.50 mm. Although a thinner tear seam is available, the score line will read through to the surface of the part if it is less than 0.457 mm. Therefore, a depth of the scoring is more than half but less than all of the skin thickness. The score line on the skin when exposed to heat at 120° C. for 1000 hours does not exhibit any heal back or rejoining. In other words, graphene infused TPU does not self-heal and helps to maintain the score line in a partially severed and separated wall fashion.

The combination of the mixed TPU and graphene composition results in both good high and low temperature performance when the final panel is installed in a vehicle. The tensile strength, elongation, and tear strength of the composition used herein should not change by more than ±30% after 500 hours of heat ageing at 120° C. More specifically, the preferred embodiment is expected to not deviate by more than ±15%. Furthermore, physical properties are also performed at −30° C. as an indicator for cold weather airbag deployments. Unaged physical properties at −30° C. are expected to be in agreement to the room temperature properties with an elongation value greater than 300%, which is an indicator that this material should not fragment during airbag deployments at this temperature.

The entire skin 15 is made from an intermixed graphene infused thermoplastic polyurethane dry blend, and can optionally include a pair of compatibilizers such as maleic anhydride and ethylene vinyl acetate ("EVA"). The preferred raw graphene nanoparticles 41 are in mechanically exfoliated graphene powder form with 6-10 layers and have an average flake size of about 40 μm. The graphene powder assists in achieving EMI shielding, mechanical property enhancements, heat dissipation, electrostatic discharge, antistatic, UV resistance, and gas barrier functions of skin 15 and of the final created instrument panel of which the skin forms a part. Moreover, exfoliation of the graphene layers in the TPU matrix controls the extent of heat resistance wherein the greater the exfoliation, the greater is the heat resistance, conductivity and EMI shielding.

A preferred TPU aliphatic has a bulk density of 500-700 kg/m$^3$. A preferred suspension grade resin is Texin 3042 from Covestro which is produced from the reaction of a cycloaliphatic isocyanate and a polyether polyol. Furthermore, possible compatibilizers can include maleic anhydride grafted TPU and/or maleic anhydride grafted polypropylene/polyethylene such as Epolene E-43/C-19 from Westlake, a propylene maleic anhydride copolymer such as A-C® 597P by Honeywell, and ethylene vinyl acetate copolymer such as a A-C® 400A from Honeywell. The maleic anhydride/ethyl vinyl co-acetate is preferably 1-8% by weight, and more preferably 2-5%, of the total blend formulation and contributes to the mechanical properties desired.

After slush molding (also known as rotational molding or rotocasting), the typical average material thickness of skin 15 in airbag region 21 is approximately 1.10 mm but can be as low as 0.70 mm. The normal tolerance is preferably 0.9-1.1 mm by way of a non-limiting example. Upon compounding, the material has a glass transition value of minus 30 to minus 65° C.

Figure 3:
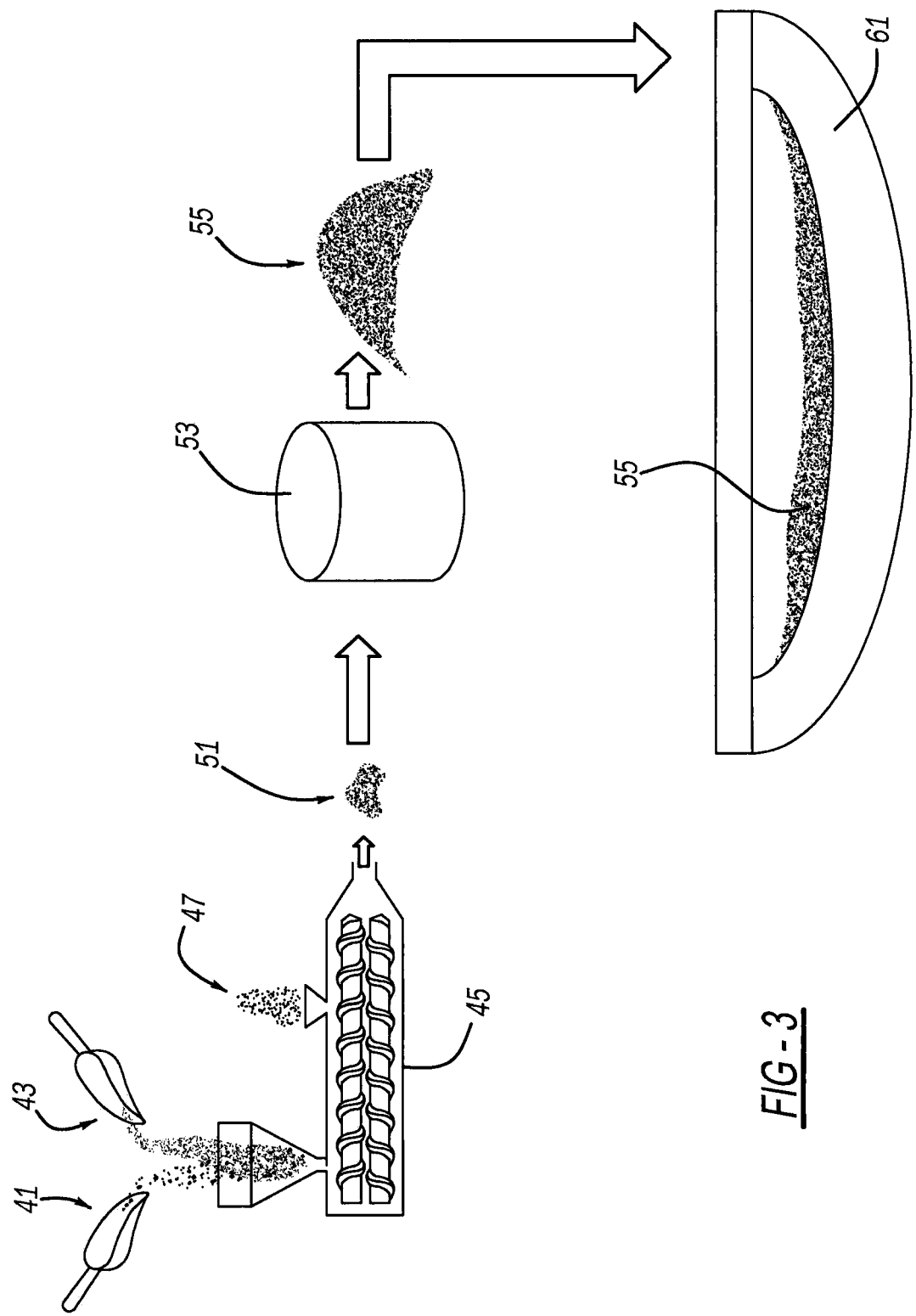
FIG. 3 is a diagrammatic view showing a method of manufacturing the present interior trim panel.
Figure 4:
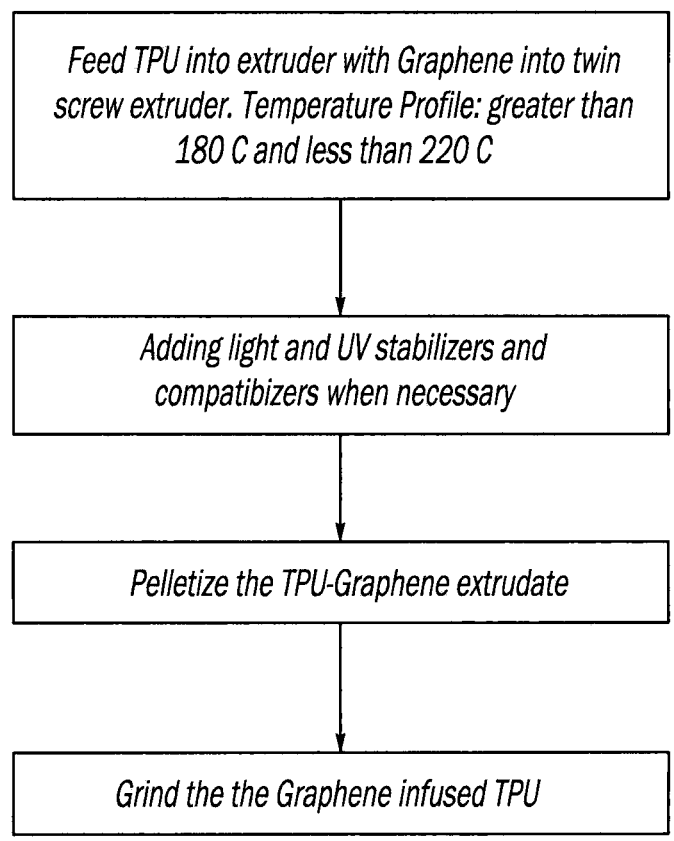
FIGS. 4 and 5 are diagrammatic flow charts showing method steps for manufacturing the present interior trim panels.
Figure 5:
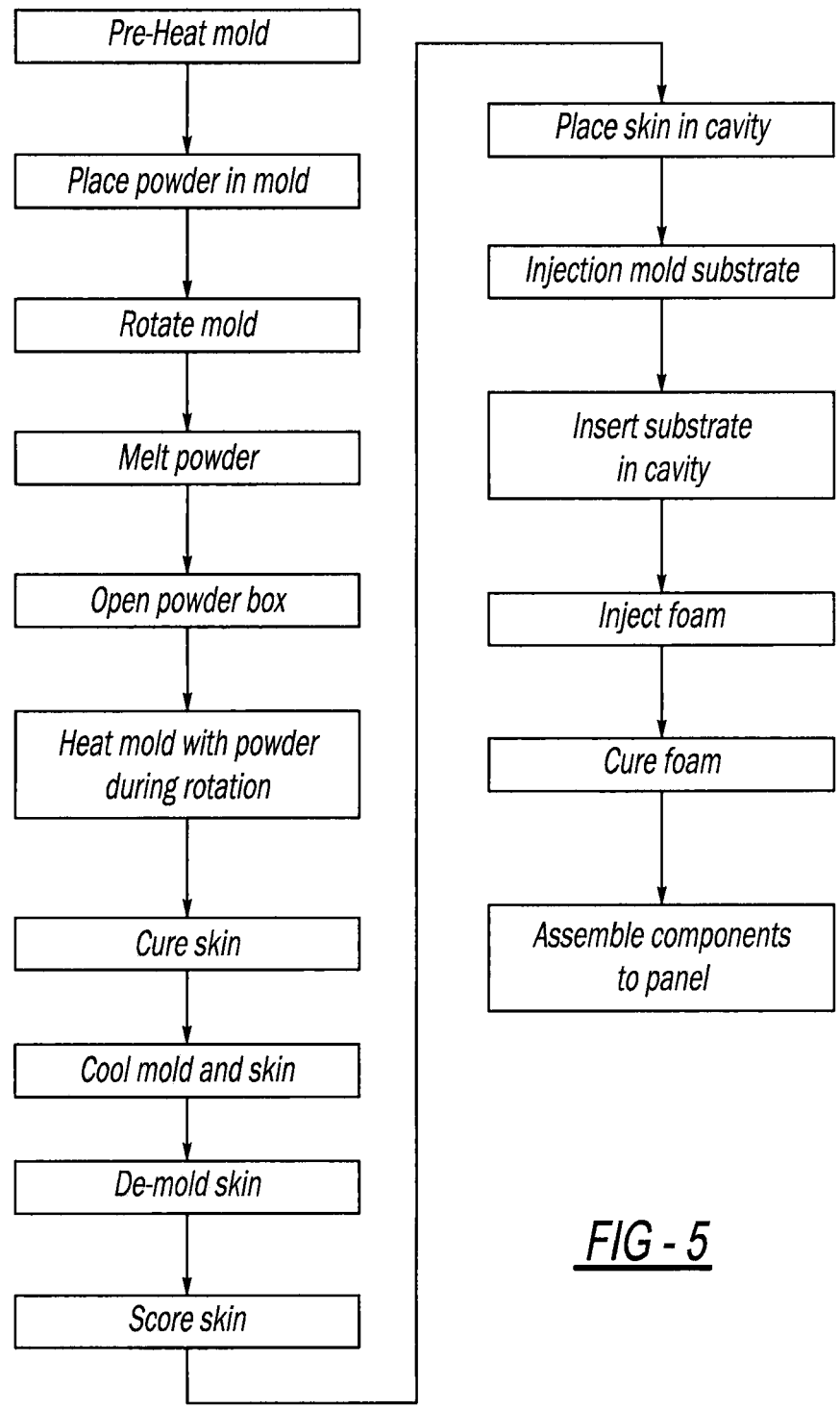

Referring now to FIGS. 3 and 4, the composition of graphene 41 and thermoplastic polyurethane 43 is fed into and then melt blended in a twin-screw extruder 45, followed by grinding to obtain slush grade powder. Optional additives 47, such as light and UV stabilizers, compatibilizers, color pigments, and the like may also be added. This formulation creates a high performance slush TPU ideally suited for seamless airbag applications in an interior of an automotive vehicle.

Skin 15 can be created using the following process. An extrusion heat profile is 180-220° C. A pre-determined amount of TPU, color pigmentation, and a stabilizer additive package are fed into extruder 45 and then graphene is added. The extrusion process helps in dispersing and mixing the graphene layers into the TPU matrix. The slurry blend is then pumped out of the extruder nozzle to pelletize under water. Dry pellets 51 obtained therefrom are then sent to a grinder 53 to obtain slush grade powder 55. The grinder may cryogenically grind, under-water grind, pulverize, wet/dry mill or the like.

As can be seen in FIGS. 3 and 4, a multipart slurry mold 61, made from nickel-based metal, is pre-heated to between 180° C.-250° C. Powder 55 is placed in a closed powder box internal to mold 61. A machine rotates mold 61 while powder 55 melts in the box. The box is automatically unclamped and opened within the mold when the powder is liquefied thereby dispersing the liquid TPU-graphene mixture to entirely coat the inner mold surfaces while the mold remains heated and rotating. The mixture subsequently cures inside mold 61 and the mold cools to about 50° C. Thereafter, the mold is opened and the flexible skin can be demolded or removed therefrom.

The knife or laser score partially cuts the tear seam on the backside surface of the skin as previously discussed. Subsequently, the scored skin is placed into another second mold cavity and a previously injection molded rigid polymeric substrate is inserted into the second mold cavity with localized gaps therebetween. This second mold is closed and an open cell soft foam is injected in the gaps between the skin and the substrate within the second mold. This process can be referred to as a "foam-in-place" or low pressure injection molding process. The foam is then cured and the finished interior trim panel is removed from the second mold. Moreover, holes may be pierced and additional components, such as brackets, clips, fasteners, ornamental appliques, HVAC outlets and the like, may thereafter be assembled to the interior trim panel to create a trim panel sub-assembly or module.

In one example, the skin material has 80-95 wt. percent of TPU resin, and 1-20 wt. percent of graphene, and 1-5 wt. percent anhydride compatibilizer. In one example, the raw graphene powder can have a maximum of 10 layers.

Upon deployment of the airbag, no skin fragmentation should occur from an airbag deployment at −30° C. and a 2 minute delay. The elongation of the skin material does not change by more than +30% after heat ageing at 120° C. Moreover, the tensile strength of the skin material does not change by more than +30% after heat ageing at 120° C. Furthermore, a tear strength at the tear seam does not change by more than 30% after heat ageing at 120° C.

An Angle of Repose ("AOR") is determined by a simple test that can be used to gauge a material's ability to flow under normal atmospheric conditions. Powders can be divided by several flowability classes but for general purposes: below an angle of 30° indicates the material will have excellent flow properties; below 40° results in fair flow properties; and above 45 indicates poor material flow properties. A flexible skin material's ability to flow can be attributed to many factors including: its coefficient of friction; its density; the size, shape/porosity of the particles; and the content and type of resin and plasticizer systems used. As an example, highly plasticized PVCs made for instrument panel applications, with good cold temperature performance, have high angles of repose (over 45°) which lead to poor material flowability, increased scrap, and a reduction of the geometry freedom allowed for a given part design. In contrast, the present material described herein using the graphene has excellent flow properties, leading to lower scrap, increased design freedom, and improved grain structure. The Angle of Repose value for the present TPU-graphene material is 26-34°.

Electromagnetic interference is a process by which disruptive electromagnetic energy is transmitted from one electronic device to another via radiated or conducted paths, or both. In an automotive electronic system, EMI can adversely affect the performance of an integrated circuit internally, as well as that of other electronic components in close proximity. The present graphene nanoparticles are conductive fillers ideally suited to shield EMI and effectively subdue or reduce the problem. The present graphene infused TPU exhibits a moderately high electrical conductivity (around 1 S·m$^{-1}$). Furthermore, the EMI shielding effectiveness obtained for the present graphene infused TPU material is 5-10 dB.

When under-water grinding is employed, spherical particles can be formed having a size distribution of:

| Sieve | Opening (μm) | % Retained |
|---|---|---|
| 35 US | 500 | 0-10 |
| 45 US | 355 | 0-30 |
| 60 US | 250 | 0-20 |
| 80 US | 180 | 30-80 |
| 100 US | 150 | 10-30 |
| 120 US | 125 | 0-10 |
| PAN | 0 | 0-10 |

The foregoing description of the embodiments has been provided for purposes of illustration and description and variations are envisioned. For example, the tear seam and/or airbag door may be differently shaped or positioned, although some advantages may not be achieved. Furthermore, the substrate can optionally include integrally molded flanges or offset angled walls. While a middle foam layer is disclosed, however, it may be omitted for some trim panels, although some of the present advantages many not be observed. The present interior trim panel can alternately be used in other transportation vehicles including airplanes, watercraft and train cars. Individual elements or features of a particular embodiment are generally not limited to that particular embodiment, but, where applicable, are interchangeable and can be used in a selected embodiment, even if not specifically shown or described, and all of the dependent claims may be multiply dependent in any combination. Such variations are not to be regarded as a departure from the present disclosure, and all such modifications are intended to be included within the scope and spirit of the present disclosure.

The invention claimed is:

1. A vehicular interior trim panel comprising an outer skin comprising 80-97 wt. percent of urethane and 1-20 wt. percent of graphene.

2. The panel of claim 1, further comprising 2-4 wt. percent of at least one of: compatibilizers and stabilizers.

3. The panel of claim 1, wherein the graphene includes 6-10 layers at least prior to melting and is exfoliated into the urethane, which is a thermoplastic polyurethane matrix.

4. The panel of claim 1, wherein the graphene includes powdered nanoparticles intermixed throughout the urethane.

5. The panel of claim 1, further comprising a rigid polymeric substrate and a soft open cell foam located between a portion of the skin and the substrate.

6. The panel of claim 1, wherein the skin remains intact at an airbag door, other than at a frangible tear seam, and no skin fragmentation occurs from an airbag deployment at −30° C.

7. The panel of claim 1, wherein:
elongation of the skin does not change by more than 30% after heat ageing at 120° C. for 500 hours;
tensile strength of the skin does not change by more than 30% after heat ageing at 120° C. for 500 hours; and
tear strength at a tear seam in the skin does not change by more than 30% after heat ageing at 120° C. for 500 hours.

8. The panel of claim 1, further comprising at least one of: a light and UV stabilizer, being mixed with the urethane and the graphene prior to rotational casting or slush molding of the skin.

9. The panel of claim 1, further comprising at least one compatibilizer of: a maleic anhydride and ethyl vinyl acetate, being mixed with the urethane and the graphene prior to rotational casting or slush molding of the skin.

10. The panel of claim 1, wherein an Angle of Repose value is 26-34°.

11. The panel of claim 1, wherein EMI shielding effectiveness of the skin is 5-10 dB.

12. The panel of claim 1, wherein an airbag tear seam remains partially severed on a backside surface of the skin and self-healing of the skin at the tear seam does not occur after initial scoring of the tear seam.

13. The panel of claim 1, wherein the vehicular interior trim panel is an impact absorbing panel with the skin being soft, and the panel is attachable to one of: (a) a wheeled automotive land vehicle, (b) a train car, (c) an airplane, and (d) a watercraft.

14. A vehicular interior trim panel comprising:
a flexible and EMI shielding outer skin comprising thermoplastic polyurethane and 1-20 wt. percent of graphene;
an inner polymeric substrate being more rigid than the skin; and
a flexible foam located between and attaching sections of the skin to the substrate.

15. The panel of claim 14, further comprising 2-4 wt. percent of at least one of: compatibilizers and stabilizers.

16. The panel of claim 14, further comprising at least one compatibilizers of: maleic anhydride and ethyl vinyl acetate, being mixed with the urethane and graphene.

17. The panel of claim 14, wherein an Angle of Repose of the skin is 26-34°.

18. The panel of claim 14, wherein EMI shielding effectiveness of the skin is 5-10 dB.

19. The panel of claim 14, wherein an airbag tear seam remains partially severed on a backside surface of the skin and self-healing of the skin at the tear seam does not occur after initial scoring of the tear seam.

20. An instrument panel comprising:
an outer skin comprising urethane and graphene;
an inner substrate being more rigid than the skin;
a flexible foam located between and attaching sections of the skin to the substrate; and
a frangible airbag tear seam partially severing a backside surface of the skin;
the instrument panel being a wheeled automotive land vehicle instrument panel.

21. The panel of claim 20, wherein EMI shielding effectiveness of the skin is 5-10 dB.

22. The panel of claim 21, wherein:
elongation of the skin does not change by more than 30% after heat ageing at 120° C. for 500 hours;
tensile strength of the skin does not change by more than 30% after heat ageing at 120° C. for 500 hours; and
tear strength at a tear seam in the skin does not change by more than 30% after heat ageing at 120° C. for 500 hours.

23. The panel of claim 20, wherein:
the substrate is polymeric;
the graphene is 1-20 wt. percent of a total composition used to make the skin; and
the urethane is a thermoplastic polyurethane.

24. A method of manufacturing comprising:
(a) mixing TPU with graphene;
(b) melt extruding the TPU and graphene mixture;
(c) adding at least one of: stabilizers and compatibilizers, to the TPU;
(d) creating pellets of the graphene infused TPU mixture;
(e) grinding the pellets;
(f) placing the ground pellets into a mold; and
(g) rotating the mold to create a flexible skin of a vehicular panel which has EMI shielding properties.

25. The method of claim 24, further comprising exfoliating layers of the graphene in the TPU at 180-220° C.

26. The method of claim 24, further comprising:
injection molding a substrate; and
injecting pliable foam between portions of the skin and the substrate.

27. The method of claim 24, further comprising:
scoring a tear seam in a backside surface of the skin;
using 80-97 wt. percent of the TPU in the skin;
using 1-20 wt. percent of the graphene in the skin; and
using 2-4 wt. percent compatibilizers and/or stabilizers in the skin.

28. The method of claim 24, wherein the graphene comprises nanoparticles having 6-10 layers in their raw form.

29. The method of claim 24, wherein there is no skin fragmentation from an airbag deployment at −30° C.

30. The method of claim 24, wherein elongation of the skin does not change by more than 30% after heat ageing at 120° C. for 500 hours.

31. The method of claim 24, wherein the EMI shielding effectiveness of the skin is 5-10 dB.

* * * * *